J. P. HANSEN.
MEASURING DEVICE.
APPLICATION FILED MAY 17, 1909.
934,167.
Patented Sept. 14, 1909.
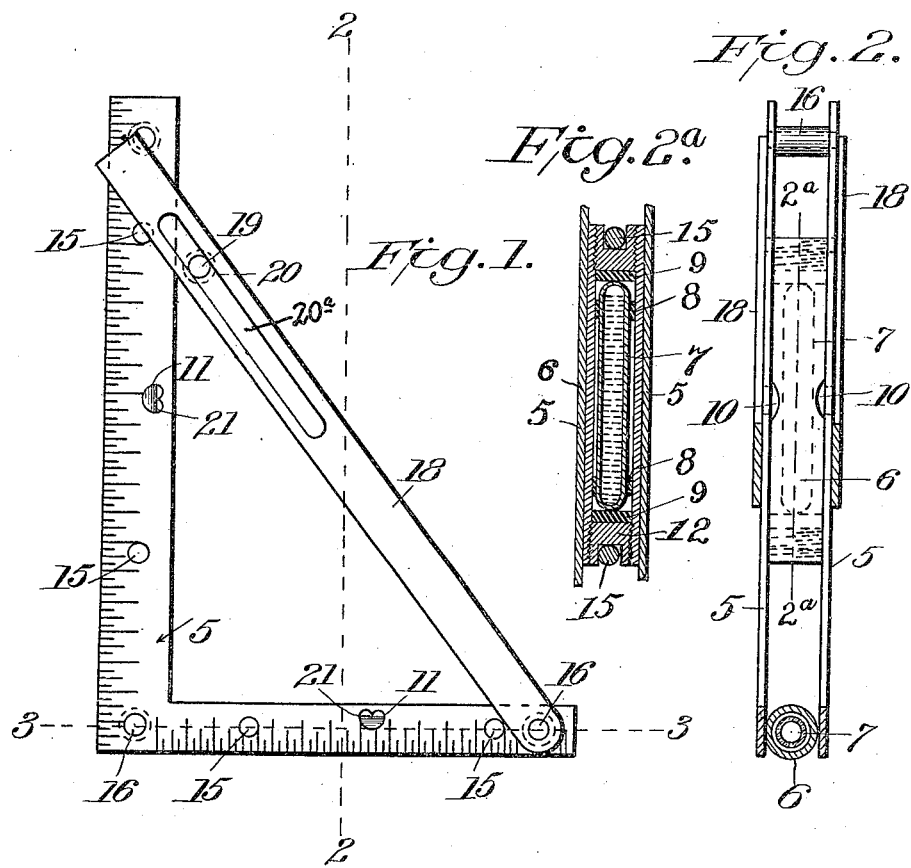
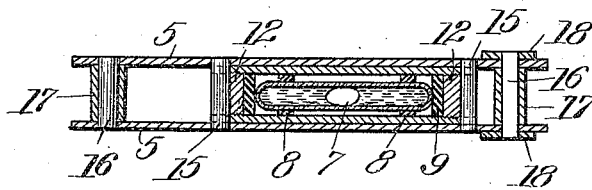
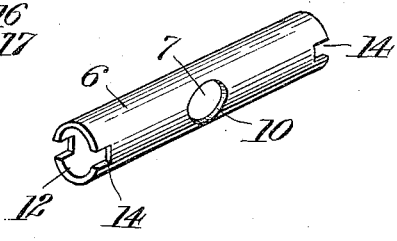
Witnesses:
C. H. Walker
E. A. Cole
Inventor:
J. P. Hansen,
By Wm. Bagger & Co.
Attorneys

UNITED STATES PATENT OFFICE.

JENS P. HANSEN, OF EAGLE, NEBRASKA.

MEASURING DEVICE.

934,167.

Specification of Letters Patent.   Patented Sept. 14, 1909.

Application filed May 17, 1909.   Serial No. 496,422.

*To all whom it may concern:*

Be it known that I, JENS P. HANSEN, a subject of the King of Denmark, residing at Eagle, in the county of Cass and State of Nebraska, have invented certain new and useful Improvements in Measuring Devices, of which the following is a specification.

This invention relates to measuring devices and it has particular reference to a combined square, plumb-level try-square and double square adapted to be used by masons, stone-masons, carpenters, and other artisans. The invention has for its object to provide a tool of simple and efficient construction which may be used interchangeably for a variety of purposes; and with these and other ends in view which will readily suggest themselves when the nature of the invention is better understood, the same consists in the improved construction and novel arrangement and combination of parts which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations, and modifications within the scope of the invention may be resorted to when desired.

In the drawing—Figure 1 is a side view of a tool constructed in accordance with the invention. Fig. 2 is a sectional view taken on the plane indicated by the line 2—2, in Fig. 1. Fig. 2ª is a sectional detail view taken on the plane indicated by the line 2ª—2ª, in Fig. 2. Fig. 3 is a transverse sectional view taken on the plane indicated by the line 3—3, in Fig. 1. Fig. 4 is a perspective view showing one of the tubular casings detached. Fig. 5 is a perspective detail view showing one of the plugs 12 detached.

Corresponding parts in the several figures are denoted by like characters of reference.

In the construction of the improved tool there are employed two ordinary metallic try-squares, 5—5, which are spaced apart by tubular casings, 6—6, which are inserted or interposed between the limbs of the squares. These tubular casings may be constructed of pieces of ordinary gas pipe of suitable dimensions to receive the spirit levels 7 which are disposed lengthwise in the tubular casings where they are held securely by means of packing rings 8, of leather, rubber or other suitable elastic or yieldable material. The pipes constituting the tubular casings are provided intermediate their ends with notches 10, through which the position of the air bubbles in the spirit levels may be observed; said notches being disposed in alinement with apertures 11 formed in the limbs of the try-squares. The tubular casings 6 are internally threaded at both ends for the reception of correspondingly threaded plugs 12 which serve to secure the spirit levels in position within the casings; washers 9 of wood, leather, rubber or other suitable yieldable material are interposed between the plugs 12 and the ends of the levels for the purpose of protecting the latter against breakage. The plugs 12 are provided at their outer ends with transverse or diametrical grooves 14 registering with notches, 14ª in the ends of the tubular casings 6 for the passage of pins or bolts 15 that serve to connect the try-squares 5—5, together, the said bolts serving the additional purpose of holding the tubular casings securely in position between the limbs of the squares. The try-squares may be connected by additional pins or bolts 16 which are preferably equipped with spacing sleeves 17 that are interposed between the limbs of the squares for the purpose of spacing the latter suitably apart.

It will be seen from the foregoing description that the tubular casings which contain the spirit levels also serve to space the try-squares apart, said tubular casings being retained securely in position by means of the bolts 15 which latter, being placed in engagement with the diametrical grooves in the plugs 12 will serve to lock the plugs securely in such a manner that displacement will be positively prevented.

The improved implement is provided with a diagonal bar composed of two side members 18 which are pivotally mounted upon a pin or bolt 16 near the outer end of the short limbs of the squares; said side members being connected near their outer ends by a screw or bolt 19 having a spacing sleeve 20, said screw or bolt being adjustably fitted in slots, 20ª in the members of the diagonal bar. In the manipulation of the implement care will be taken to so adjust the pin 19 and sleeve 20 that when the latter abuts upon the long limbs of the squares the diagonal bar will occupy such proper position as may have been previously determined upon.

The apertures 11 through which the spirit levels are observed are preferably formed with pointers or indices as shown at 21 in order that the implement may be used with perfect accuracy.

From the foregoing description taken in connection with the drawings hereto annexed the operation and advantages of this invention will be readily understood by those skilled in the art to which it pertains. The manner of using the implement will readily suggest itself to any skilled workman, and it will be seen that horizontal and vertical observations may be simultaneously taken; it will further be evident that this improved implement is capable of being utilized for a variety of purposes for which a plurality of tools have heretofore been required. The construction is simple and inexpensive, and the implement is compact and thoroughly convenient and efficient for the purposes for which it is provided.

Having thus described the invention what is claimed is:

1. A device of the character described comprising two try-squares, tubular casings interposed between the limbs of the squares, means for connecting the squares together, spirit levels within the casings, threaded plugs at the ends of said casings, and washers interposed between the plugs and the ends of the spirit levels; said tubular casings and threaded plugs being provided with slots or notches and the limbs of the squares being provided with apertures alining with said notches; and fastening members extending through said apertures and slots or notches.

2. In a device of the character described a pair of suitably connected try-squares, tubular casings interposed between the limbs of the squares, and having notched ends, spirit levels within the casings, threaded plugs at the ends of said casings provided with grooves at the outer ends, pins engaging said grooves and the notches of the casings and connecting the limbs of the squares, and washers interposed between the plugs and the levels; said tubular casings and the limbs of the squares being provided with openings through which the levels may be observed.

3. A device of the character described comprising two suitably connected try-squares, tubular casings interposed between the limbs of the squares, spirit levels within the casings, threaded plugs at the ends of the casings provided with grooves at their outer ends, connecting members extending through the limbs of the squares and engaging said grooves, and a diagonal arm comprising two side members pivotally mounted upon one pair of limbs of the try-squares, said side members being provided with slots; and a connecting-pin adjustably fitted in said slots, and having a spacing sleeve adapted to abut upon the second pair of limbs of the try-squares.

In testimony whereof I affix my signature in presence of two witnesses.

JENS P. HANSEN.

Witnesses:
  C. C. PRICE,
  A. F. REMALY.